United States Patent [19]

Odoni et al.

[11] Patent Number: 4,871,033

[45] Date of Patent: Oct. 3, 1989

[54] MOTOR-DRIVEN HAND TOOL WITH BRAKING TORQUE DEVICE

[75] Inventors: Walter Odoni, Fürstentum, Liechtenstein; Richard Boesch, Rüthi, Switzerland

[73] Assignee: Hilti Aktiengesellschaft, Fürstentum, Liechtenstein

[21] Appl. No.: 300,482

[22] Filed: Jan. 23, 1989

[30] Foreign Application Priority Data

Jan. 30, 1988 [DE] Fed. Rep. of Germany ....... 3802740

[51] Int. Cl.$^4$ ............................................. B25B 23/14
[52] U.S. Cl. ..................... 173/12; 192/17 D; 188/166
[58] Field of Search .......... 173/12; 192/12 BA, 17 D; 188/166, 291

[56] References Cited

U.S. PATENT DOCUMENTS

| | | | |
|---|---|---|---|
| 2,885,042 | 5/1959 | Frechette | 192/17 D |
| 3,476,192 | 11/1969 | Noerr, Jr. | 173/12 |
| 3,921,771 | 11/1975 | Szabo | 192/12 BA |
| 4,078,618 | 3/1978 | DePagter et al. | 173/12 |
| 4,328,871 | 5/1982 | Gluskin | 173/12 |

Primary Examiner—Douglas D. Watts
Assistant Examiner—James L. Wolfe
Attorney, Agent, or Firm—Toren, McGeady & Associates

[57] ABSTRACT

In a motor-driven hand tool, such as a drill, an inert mass is rotatably supported in a housing and is connected to the housing by a spring encircling a driven shaft mounted in the housing. The driven shaft is arranged to rotate a drill bit secured to the shaft. If the driven shaft is prevented from rotating and the housing rotates relative to the shaft, the spring tightens about and grips the driven shaft exerting a braking torque on it. The braking torque reduces the reaction torque required of the tool operator and affords a more rapid release of an overload clutch acting on the driven shaft. The overload clutch is formed by a collar, a gear wheel, a cup spring, and an adjustable ring nut, all located on the driven shaft.

6 Claims, 1 Drawing Sheet

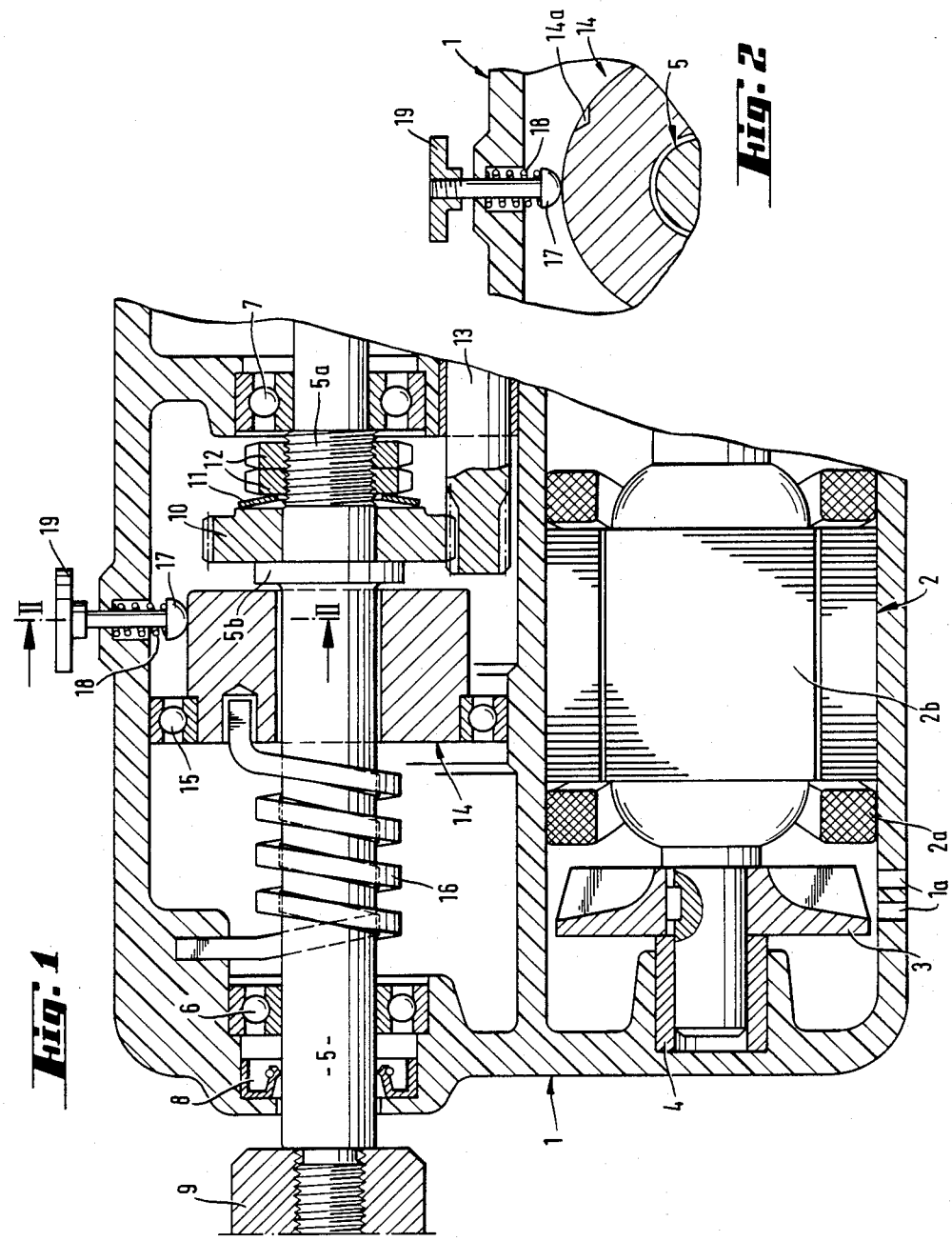

MOTOR-DRIVEN HAND TOOL WITH BRAKING TORQUE DEVICE

BACKGROUND OF THE INVENTION

The present invention is directed to a motor-driven hand tool, such as a drill, a hammer drill, a grinder or the like, and includes a housing containing a drive motor. A shaft driven by the drive motor is located in and projects out of the housing for transmitting rotary motion to a tool bit secured on the shaft. Further, an inert mass is rotatably supported in the housing coaxial with the driven shaft and connected to the housing by a spring element.

Hand tools of the above type are used principally by craftsmen, however, in increasing numbers, they are also used by do-it-yourselfers. There is the danger in using such tools that the tool bit jams or becomes seized and the driven shaft is blocked, with the result, that as a reaction, the housing rotates about the axis of the driven shaft. If the tool operator does not anticipate such a reaction, the hand tool can be thrust out of the operator's hands. If he is working in a dangerous position, such as on scaffolding or a ladder, he can lose his balance and fall to the ground. The blocking of the tool can, in addition, tend to overstress the joints of the operator. To avoid such situations, it has been known in DE-OS No. 2 326 087 to arrange an overload clutch between the drive motor and the driven shaft so that disengagement takes place if a predetermined torque is exceeded. When the overload clutch interrupts the drive between the motor and the driven shaft, the operator must supply a correspondingly large reaction torque. If the operator is unable to provide the reaction torque, then there is no interruption of the drive and the tool remains operative.

In a further solution disclosed in DE-OS No. 3 041 099, an inert mass is rotatably supported in the housing coaxial with the driven shaft. If the tool bit becomes seized, the housing rotates around the receiving spindle, however, the rotatably supported inert mass remains immobile because of its inertia and a relative rotation takes place between the housing and the inert mass. Preferably, such relative rotation is determined by a contactless sensor and a signal is produced and utilized for switching off the energy supplied to the tool or for actuating a clutch or an electromechanical brake. To return the inert mass into its original position, the mass is connected to the housing by a spring element. This arrangement requires expensive electronic or electromechanical components, and such components are sensitive and are marginally usable due to the rough treatment experienced by the hand tool on a construction site.

SUMMARY OF THE INVENTION

The primary object of the present invention is to provide a simple and safe arrangement for exerting a braking torque on the driven shaft in the event of a sudden rotation of the housing around the shaft.

In accordance with the present invention, the inert mass surrounds the driven shaft and the spring element is formed as a wraparound spring for gripping the driven shaft and exerting a braking torque on the shaft if there is relative rotation of the housing with respect to the inert mass in one rotational direction.

By shaping the spring element as a laterally enclosing or wraparound spring, the spring element carries out two functions. These functions are performed in two different conditions of the spring element. In the unloaded condition, the spring retains the inert mass in the original state in a specific rotational position with respect to the housing. If there is a relative rotation between the inert mass and the housing, due to a sudden rotation of the housing about the driven shaft, the wraparound spring grips the surface of the driven shaft and in this condition exerts a braking torque on the shaft due to friction. The braking torque is approximately proportional to the movement of the housing with respect to the inert mass.

The wraparound spring is tensioned by rotation of the housing relative to the inert mass. Due to its elasticity, the spring tends to relieve its tension and thus cancel out the relative rotation. Further, the application of the braking torque would also be cancelled. To avoid such an occurrence, a detent or snap-in element is provided between the inert mass and the housing, and is engageable by the introduction of the braking torque exerted by the wraparound spring. Accordingly, the detent element secures the inert mass with respect to the housing in the rotated position and assures that the braking torque is maintained until either the detent element is released or the torque no longer occurs. The detent element can be formed as a ball catch or the like.

The kinetic energy stored in the rotor of the drive motor, as well as in the shafts and gear wheels, arranged between the drive motor and the driven shaft, must be transformed into frictional heat to cancel out the rotary motion between the driven shaft and the housing. This is not possible within a short period of time and, in addition, leads to thermal overload of the various parts in case of frequent responses. To avoid this problem, an overload clutch is arranged to interrupt the transmission of rotary motion if a predetermined torque is exceeded and, advantageously, the clutch is located between the drive motor and the driven shaft. After the overload clutch releases the components located upstream of the clutch, viewed in direction of transmittal of the torque, the motor can continue to operate while the driven shaft is braked by the wraparound spring. Due to the braking torque developed upon actuation of the wraparound spring, the reaction torque to be supplied by the operator and required for operation of the overload clutch, is correspondingly diminished. The overload clutch also becomes operative in the event the operator is not prepared to apply the reaction torque.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is a view of a portion of a hand tool incorporating the present invention; and FIG. 2 is a cross-sectional view of the hand tool taken along the line II—II in FIG. 1.

DETAILED DESCRIPTION OF THE INVENTION

In FIGS. 1 and 2, a part of a hand tool is shown including a housing 1. A drive motor 2 is located within the housing 1. Drive motor 2 is formed basically of a stator 2a and a rotor 2b. A cooling fan 3, draws cool air through the stator 2a and blows the air out through air outlet openings 1a in the housing into the ambient air. Rotor 2b is rotatably supported in a bearing bushing 4 secured in the housing.

As viewed in FIG. 1, a driven shaft 5 is located above and supported parallel to the axis of the rotor 2b and the shaft is rotatably supported in ball bearings 6, 7 mounted in the housing. At the front or left end of the housing 1, a sealing ring 8 encircles and bears against the surface of the driven shaft for preventing any flow of lubricant out of the housing 1 and, at the same time, prevents any passage of dirt or other contaminating material into the housing 1. Part of the driven shaft 5 projects axially out of the front end of the housing 1, and a tool bit holder 9 is secured on the projecting end and serves to hold the tool bit, not shown. Adjacent the bearing 7, a gear wheel 10 is arranged on the driven shaft 5. Gear wheel 10 is biased by a cup spring 11 against a collar 5b on the driven shaft 5. Cup spring 11 can be adjustably prestressed or biased by two annular nuts 12 located between the cup spring and the bearing 7. The nuts 12 can be tightened against one another on an external thread 5a on the shaft. Gear wheel 10, cup spring 11, collar 5b and the nuts 12, in combination, form an overload clutch which limits the torque that can be transmitted form the gear wheel 10 to the driven shaft 5. If the torque to be transmitted becomes excessively large, then the gear wheel slips on the driven shaft 5 and the transmission of torque from the pinion shaft 13 to the driven shaft 5 is interrupted.

An inert mass 14 is rotatably supported by ball bearings 15 in the housing 1, and the mass is coaxial with respect to the driven shaft 5. A coiled or wraparound spring 16 connects the inert mass 14 with the housing 1. At one end, the spring 16 is secured in the housing, at its other end it is secured to the inert mass 14, and between its ends the spring coils around the driven shaft 5. Under ordinary operation conditions, the spring 15 is spaced from the driven shaft 5. If the inert mass 14 rotates relative to the housing 1 in one rotational direction, the spring 16 tightens about and grips the driven shaft 5 exerting a braking torque on the shaft. Such relative rotation takes place if a tool bit held in the tool bit holder becomes seized in a receiving material, so that the continued rotation of the driven shaft is prevented. While the tool bit is seized, because of the torque which continues to be exerted by the drive motor 2, the housing is accelerated around the driven shaft. Because of its inertia, the inert mass remains immobile or stationary, so that the housing 1 rotates relative to the inert mass 14. Because of the braking moment developed by the spring 16 on the driven shaft 5, further rotation of the housing 1 is prevented. The braking torque finally leads to the release of the overload clutch formed by the gear wheel 10 and cup spring 11.

To prevent any return rotation of the inert mass 14 and a premature cancellation of the braking torque, a detent or snap-in device is provided. The detent device is comprised of a snap-in bolt 17 biased against the outer circumference of the inert mass 14 by a compression spring 18 seated within a recess in the interior of the housing 1. Inert mass 14 has a snap-in recess 14a located in its outer circumference, note FIG. 2, so that the snap-in bolt 17 is biased into the recess 14a after a predetermined angular rotation of the housing 1 relative to the inert mass 14. An actuation lever 19 is secured to the end of the snap-in bolt 17 on the outside of the housing 1. After switching off the drive motor 2, snap-in bolt 17 can be pulled outwardly by the actuation lever 19, opposite to the biasing force of the compression spring 18, for disengaging the bolt 17 from the recess 14a. The coiled or wraparound spring 16, under tension up until this point in time, can rebound and return the inert mass 14 back into its initial position with respect to the housing 1. When this takes place, the driven shaft 5 is released and the hand tool is again ready to be operated.

While specific embodiments of the invention have been shown and described in detail to illustrate the application of the inventive principles, it will be understood that the invention may be embodied otherwise without departing from such principles.

We claim:

1. Motor driven hand tool, such as a drill, hammer drill, grinder or the like, comprising a housing, a drive motor located within said housing, a driven shaft located within said housing, means within said housing extending between said drive motor and said driven shaft for rotating said shaft, said driven shaft projecting out of said housing and arranged to hold and rotate a bit, an inert mass rotatably supported in said housing and disposed coaxial with said driven shaft, a spring element connecting said inert mass to said housing, wherein the improvement comprises that said inert mass is annular and encircles said driven shaft, said spring element encircles said driven shaft and is displaceable from a first condition in spaced relation to said driven shaft to a second condition in gripping engagement with said driven shaft for exerting a braking action on said shaft in the event of rotation of said housing relative to said inert mass.

2. Motor driven hand tool, as set forth in claim 1, wherein a detent device located between said housing and said inert mass and engageable with said inert mass for holding it in position relative to said housing when the braking action is effected by said spring element on said driven shaft.

3. Motor driven hand tool, as set forth in claim 2, wherein said detent device comprises a bolt mounted in said housing, a spring encircling said bolt and mounted in said housing for biasing said bolt against said inert mass, and a detent recess in an outer circumferential surface of said inert mass for receiving said bolt after a predetermined angular displacement of said housing relative to said inert mass.

4. Motor driven hand tool, as set forth in claim 1, wherein an overload clutch is arranged between said drive motor and said driven shaft for interrupting the transmission of rotary movement from said drive motor to said shaft if a predetermined torque is exceeded.

5. Motor driven hand tool, as set forth in claim 3, wherein said overload clutch comprises a collar located on said driven shaft, a gear wheel positioned on said driven shaft in contact with said collar, a cup spring encircling said driven shaft and in engagement with said gear wheel on the opposite side thereof from said collar, and means on said driven shaft for adjustably stressing said cup spring against said gear wheel.

6. Motor driven hand tool, as set forth in claim 1, wherein said spring element has a first end secured in said inert mass and a second end secured in said housing and said spring has a coiled section located between said first and second ends encircling said driven shaft.

* * * * *